Figure 1:
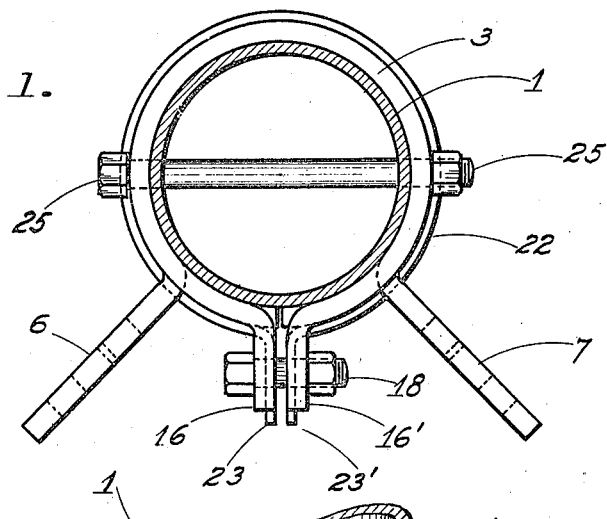

Jan. 6, 1925.

1,522,309

J. D. McEWEN

OIL WELL DERRICK CLAMP

Filed Feb. 14, 1923

WITNESSES

C. R. Halbert
A. B. Wallace

INVENTOR

John Donald McEwen
By Winter & Brown
his Attys

Patented Jan. 6, 1925.

1,522,309

UNITED STATES PATENT OFFICE.

JOHN DONALD McEWEN, OF PITTSBURGH, PENNSYLVANIA, ASSIGNOR TO LEE C. MOORE & CO. INC., OF PITTSBURGH, PENNSYLVANIA, A CORPORATION OF PENNSYLVANIA.

OIL-WELL DERRICK CLAMP.

Application filed February 14, 1923. Serial No. 618,956.

*To all whom it may concern:*

Be it known that I, JOHN DONALD McEWEN, a citizen of the United States, and a resident of Pittsburgh, in the county of Allegheny and State of Pennsylvania, have invented a new and useful Improvement in Oil-Well Derrick Clamps, of which the following is a specification.

This invention relates to a coupling clamp or socket for metal towers or derricks, particularly such as are used for oil wells.

The object of the invention is to improve upon prior constructions of metal towers or derricks, and especially by providing a clamp for uniting the meeting ends of the leg sections, which clamp is formed of forged metal, preferably plate metal, so that it is light and yet very strong, which can be fabricated at a minimum labor cost, and can be very tightly clamped onto the leg sections, thereby preventing failure of the tower or derrick on account of looseness at the clamp.

The tower or derrick itself, except as to the clamp or socket, is of well known construction, that is to say, is constructed entirely of metal tubes in order to get the maximum strength with the minimum weight, the legs being inclined so that the derrick tapers towards its top, these legs being composed either of plain cylindrical tubes or composite tubes made up of a plurality of concentric sections telescopically arranged. The meeting ends of adjacent leg sections are secured in the clamp sockets to which the braces and girts are attached, and the clamps are customarily also located about midway of the leg sections for the attachment of intermediate braces.

It is a special object of the invention to provide a clamp or socket which is adapted for use either for joining the ends of adjacent leg sections or which may be used for the attachment of the intermediate braces, and which will in either instance firmly grip and brace the legs so as to assure a rigid and stiff structure, it being well known that any looseness of the leg sections under strains permits movement thereof often resulting in the ultimate failure of the derrick or tower.

With many known types of clamps or sockets which are formed of plate metal or by forging and contain ears or lugs fabricated by striking or bending up portions of the metal thus leaving apertures or openings therein, difficulty is experienced because of the shearing or tearing of said lugs under excessive strains to which they are subjected, due chiefly to the necessarily restricted dimensions of the same.

It is a special object to provide a clamp overcoming the above mentioned difficulty, by employing a single lug whereby the several stresses to which it is subjected are distributed more efficiently with a minimum section of material, since some of the stresses are confined to the lug instead of being transmitted to the clamp proper, as is the case when using several separate lugs.

Difficulty is also experienced due to the fact that the leg sections are not braced throughout their entire circumferential extent adjacent their point of abutment. It is a further special object to overcome the above named difficulties by providing a clamp or socket which will not only afford anchoring means of substantial extent sufficient for the attachment of both the girts and braces but which will contact substantially the entire circumferential extent of adjacent leg sections contiguous their abutting ends.

It is also a further special object to provide a clamp or socket of the character above referred to in which the cylindrical portion thereof is equipped with suitable apertures disposed diametrically opposite each other for the reception of bolts which may be passed through the leg sections, thus positively binding all of the parts into intimate contact and preventing relative longitudinal movement therebetween, and to dispose these diametrically arranged apertures relatively to the openings formed by the striking up of the encircling lugs so as to cooperate in such manner as to position a clamp collar used in connection with the socket.

These and other objects will more fully appear when taken in connection with the following description and the appended claims.

Figure 2:
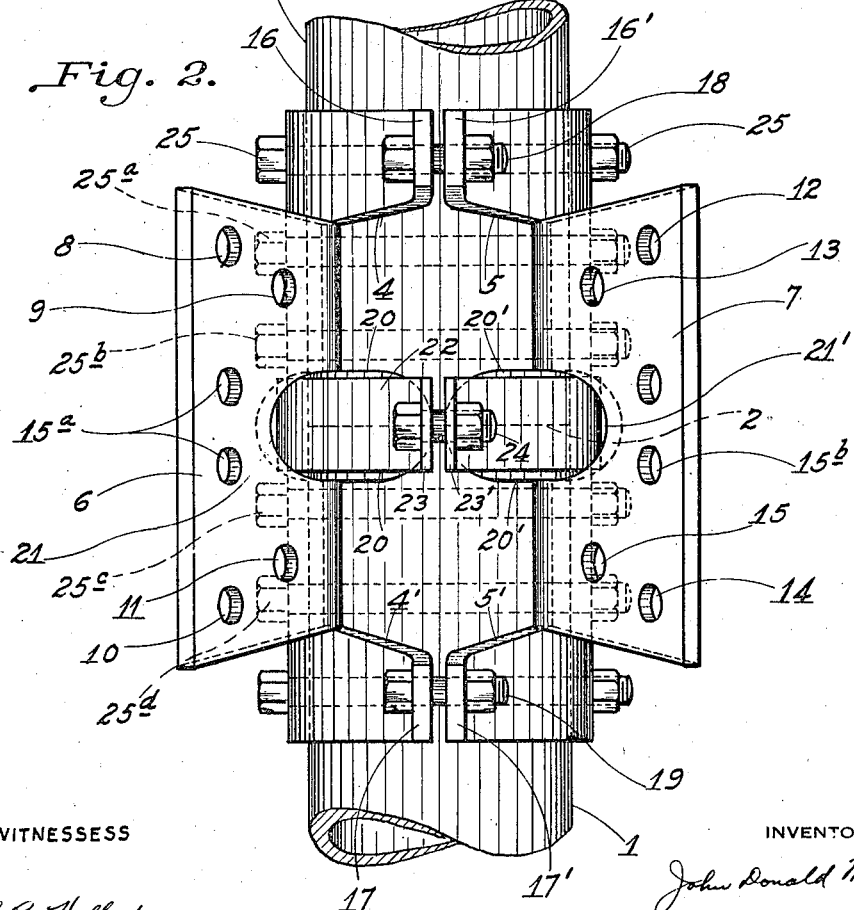

In the drawings, Fig. 1 is a transverse sectional view taken through the clamp or socket arranged in operative position, and illustrating one embodiment of the invention; and Fig. 2 is an elevation showing the socket employed for joining two abutting leg sections.

The extremities of two adjacent leg sections of the derrick are indicated at 1, 1', which are adapted to abut in a well known manner along the line 2, whereby to form an effective continuous leg. The clamp or socket proper comprises the resilient cylindrical sleeve portion 3 which is slit or open at one side and which may be made by stamping from suitable plate metal and subsequently bending to shape or by suitable forging operations.

The metal of the clamp is incised or cut at separated points on each side of its slit or open side, as indicated at 4 4', 5 5', the metal located therebetween being bent outwardly to form the flanges 6 and 7 which lie in planes corresponding to radii of the cylindrical sleeve, as clearly shown in Fig. 1. The lines of cut 4 4' 5 5' lie in planes which are inclined slightly away from a plane midway of the length of the clamp and normal to its axis so as to give a greater expanse of metal adjacent the outer terminals of the radial flanges to afford an increased bearing surface for the braces which are adapted to be attached by means of appropriately disposed apertures 8 to 15 located near the opposite ends of the flanges, as shown in Fig. 2. Additional pairs of apertures 15$^a$ and 15$^b$ are also provided in the radial flanges for attaching the usual horizontal girts.

The portions of the sleeves beyond the flanges 6, 7 are bent outwardly at the margins of the slit to form the pairs of ears 16, 16' and 17, 17', the ears of each pair facing one another and preferably lying in parallelism. These ears are perforated for the reception of compression bolts of well known construction indicated at 18 and 19 for binding the clamp to the leg sections.

At points substantially midway of the length of the flanges 6, 7, which corresponds to the midpoint of the clamp, a portion of the metal of the flanges is bent or struck up forming the lugs 20, 20', and leaving the openings 21, 21'. The lugs project inwardly so as to bridge the open slit, terminating in close proximity of each other, and are curved to correspond to the curvature of the body of the sleeve, consequently in effect forming a continuation thereof. A clamping collar 22 equipped with the perforated terminal ears 23, 23', for the reception of the compression bolt 24 is adapted to encircle the central portion of the sleeve and lie within the openings 21, 21', so as to seat upon the outer surface of the lugs 20, 20', as clearly shown in Fig. 2.

The body of the sleeve is provided with a plurality of diametrically opposed apertures throughout its entire length which receive a series of bolts indicated at 25, 25$^a$, 25$^b$, 25$^c$ and 25$^d$. These bolts not only pass through the sleeve but also through apertures in the leg sections and serve to bind the coupling into intimate contact with the leg sections as well as to prevent relative longitudinal movement therebetween.

The bolts 25$^b$ and 25$^c$ lie just above and below the location of the openings 21, 21'. Consequently, the heads and nuts thereof extend in close proximity to the said openings and aid the same in positioning the clamp collar 22 during the assembly of the parts.

The method of using the clamp is obvious from the above description, the drawings illustrating the parts assembled in operative position for joining two adjacent leg sections together. The internal diameter of the clamp when disassembled is slightly greater than the external diameter of the leg sections in order that the clamp may be easily slipped thereon in a well known fashion, it being the usual practice to first bind the lower portion of the clamp to the bottom section 1', the superposed section 1 being subsequently inserted, and the upper half of the clamp bound thereto in order to connect the two leg sections. The clamp collar 22 is then finally tightened bringing the lugs 20, 20' into intimate contact with the leg sections and strengthening the entire construction.

Because of the fact that the collar 22 overlies the curved lugs 20, 20', the outer surface of which serves as a seat therefor, and the said lugs extend into close proximity to each other, the joint between abutting ends of leg sections is covered throughout substantially its entire circumferential extent. This results in bracing the derrick structure at a most critical point, and cooperates with the remaining portions to strengthen the whole structure. It is also noted that the flanges 6, 7 are of substantial dimension serving as attachments for both the braces and girts, and are so associated with the body of the sleeve as to form a strong rigid construction.

Although the coupling has been described particularly in connection with its use for joining adjacent leg sections, it is equally applicable for use at suitable points throughout the length of the several panels for attaching the intermediate braces.

I claim:

1. A clamp for towers, derricks and the like, comprising a cylindrical resilient slit sleeve having perforated ears for receiving compression bolts, flanges for attachment to the braces and girts, the body of said flanges being provided with a struck-up lug forming a continuation of the said cylindrical sleeve.

2. A clamp for towers, derricks and the like, comprising a cylindrical resilient slit sleeve having perforated ears adjacent its extremities for receiving compression bolts, elongated flanges intermediate said ears for attachment to the braces and girts, the body of said flanges being provided with a struck-up lug, the lugs of the flanges at the opposite sides of the slit being bent towards each other and adapted to contact the leg sections whereby to brace the entire structure.

3. A clamp for towers, derricks and the like, comprising a cylindrical resilient slit sleeve having perforated ears adjacent its extremities for receiving compression bolts, elongated radial flanges intermediate said ears for attachment to the braces and girts, the body of said flanges being provided with a struck-up lug, the lugs of the flanges at the opposite sides of the slit projecting towards each other and forming a continuation of the said cylindrical sleeve.

4. A clamp for towers, derricks and the like, comprising a cylindrical resilient slit sleeve having perforated ears adjacent its extremities for receiving compression bolts, elongated radial flanges intermediate said ears for attachment to the braces and girts, the body of said flanges being provided with a struck-up lug, the lugs of the flanges at the opposite sides of the slit projecting towards each other and forming a continuation of the said cylindrical sleeve, and a clamp collar encircling the sleeve and overlying the said lugs, the collar passing through the openings formed by striking up the said lugs.

5. A clamp for towers, derricks and the like comprising a cylindrical resilient slit sleeve having perforated ears adjacent its extremities for receiving compression bolts, elongated flanges intermediate said ears for attachment to the braces and girts, the body of said flanges being provided with a struck-up lug midway of its length, the lugs of the flanges at the opposite sides of the slit being bent towards each other and curved so as to form a continuation of the said sleeve, the extremities of the curved lugs terminating in close proximity whereby to cover the meeting ends of the leg sections and form an efficient brace therefor.

6. A clamp for towers, derricks and the like comprising a cylindrical resilient slit sleeve having perforated ears adjacent its extremities for receiving compression bolts, elongated flanges intermediate said ears for attachment to the braces and girts, the body of said flanges being provided with a struck-up lug midway of its length, the lugs of the flanges at the opposite sides of the slit being bent towards each other and curved so as to form a continuation of the said sleeve, the extremities of the curved lugs terminating in close proximity whereby to cover the meeting ends of the leg sections and form an efficient brace therefor, and a clamp collar encircling the sleeve and overlying the said lugs, the collar passing through the openings formed by striking up the lugs.

7. A clamp for towers, derricks and the like comprising a cylindrical slit sleeve adapted to telescopically receive and snugly contact the exterior of the leg sections throughout having perforated ears adjacent the extremities thereof for receiving compression bolts, elongated radial flanges intermediate the said ears for attachment to the braces and girts, the body of the sleeve having a plurality of diametrically opposed apertures for the reception of bolts which are adapted to pass through the said sleeve and leg sections.

8. A clamp for towers, derricks and the like comprising a cylindrical slit sleeve having perforated ears adjacent the extremities thereof for receiving compression bolts, elongated radial flanges intermediate the said ears for attachment to the braces and girts, the body of the sleeve having a plurality of pairs of diametrically opposed apertures for the reception of bolts which are adapted to pass through the said sleeve and leg sections, the body of said flanges being provided with struck-up lugs which are curved to form a continuation of the sleeve, said lugs being disposed at a point along the length of the sleeve intermediate and in close proximity to pairs of said diametrically opposed apertures, a clamp collar encircling the sleeve and overlying the said lugs, said collar passing through the openings formed by striking up the lugs whereby the said collar will be positioned not only by the said openings but by the heads of the bolts cooperating with the said apertures.

9. A clamp for towers, derricks and the like, comprising a cylindrical slit sleeve adapted to telescopically receive and snugly contact the exterior of the leg sections throughout provided with elongated marginal flanges disposed at opposite sides of the said slit and projecting radially outwards therefrom for attachment to the braces and girts, the body of the sleeve having a plurality of diametrically disposed apertures for the reception of bolts which are adapted to pass through the said sleeve and leg sections.

In testimony whereof, I sign my name.

JOHN DONALD McEWEN.

Witness:
 Chas. W. Beal.